United States Patent [19]

Matsuda et al.

[11] Patent Number: 5,499,247
[45] Date of Patent: Mar. 12, 1996

[54] MULTIPLEX TRANSMISSION SYSTEM HAVING PLURALITY OF NODES AND COMMON TRANSMISSION LINE AND USING DIVIDED DATA AREAS

[75] Inventors: Yutaka Matsuda; Hiroo Moriue; Kyosuke Hashimoto, all of Hiratsuka; Mitsuru Akimoto, Yokohama; Seiji Hirano, Hiroshima; Osamu Michihira, Hiroshima; Koji Terayama, Hiroshima; Hiroaki Sakamoto, Fukuyama; Koji Umegaki, Hiroshima, all of Japan

[73] Assignees: The Furukawa Electric Corp., Tokyo; Mazda Motor Corp., Hiroshima, both of Japan

[21] Appl. No.: 183,114

[22] Filed: Jan. 18, 1994

Related U.S. Application Data

[63] Continuation of Ser. No. 861,324, Mar. 31, 1992, abandoned.

[30] Foreign Application Priority Data

Apr. 2, 1991 [JP] Japan .................................. 3-070033
Oct. 25, 1991 [JP] Japan .................................. 3-279596

[51] Int. Cl.$^6$ .................................................... H04L 12/40
[52] U.S. Cl. ...................... 370/85.3; 370/85.8; 370/95.2; 370/105.3; 340/825.08; 371/32; 371/47.1; 341/69; 341/94
[58] Field of Search ............. 370/94.1, 94.2, 370/95.1, 95.2, 95.3, 85.1–85.5, 85.15, 82, 85.6, 85.8, 825.47, 105, 300; 340/825.5, 825.05, 825.06, 825.07, 825.08, 825.54; 371/32, 33, 47.1, 37.1; 341/69, 94

[56] References Cited

U.S. PATENT DOCUMENTS

| | | | |
|---|---|---|---|
| 4,763,320 | 8/1988 | Rudolph et al. | 370/95.1 |
| 4,910,733 | 3/1990 | Sommani et al. | 370/94.1 |
| 4,914,654 | 4/1990 | Matsuda et al. | 370/85.1 |
| 4,951,281 | 8/1990 | Muto et al. | 370/94.1 |
| 4,998,245 | 3/1991 | Tanaka et al. | 370/95.1 |
| 5,010,329 | 4/1991 | Nagakura | 370/858 |
| 5,121,396 | 6/1992 | Irvin et al. | 371/37.1 |
| 5,163,056 | 11/1992 | Hagiwara et al. | 371/37.1 |

OTHER PUBLICATIONS

"Data and Computer Communication" by W. Stallings, Macmillan Publishing comp. pp. 149–152 1988.

Primary Examiner—Alpus Hsu
Assistant Examiner—Ajit Patel
Attorney, Agent, or Firm—Frishauf, Holtz, Goodman & Woodward

[57] ABSTRACT

A multiplex transmission system includes a plurality of multiplex nodes interconnected by a common multiplex transmission line. Data frames are transmitted among the multiplex nodes through the multiplex transmission line. A data frame transmitted from a sending multiplex node includes a data area which is divided into subdivided areas in accordance with data transmitted therefrom and data transmitted from receiving multiplex nodes which send data in response to a send request, in accordance with the number of data pieces or the number of bits, and the receiving nodes send data to respective subdivided areas in a predetermined order, to thereby carry out a data transmission. Accordingly, the sending multiplex node can simultaneously collect data from the receiving multiplex nodes which are functionally subordinate. When any of the receiving multiplex nodes fails to return an ACK signal, the sending multiplex node retransmits the data frame.

18 Claims, 17 Drawing Sheets

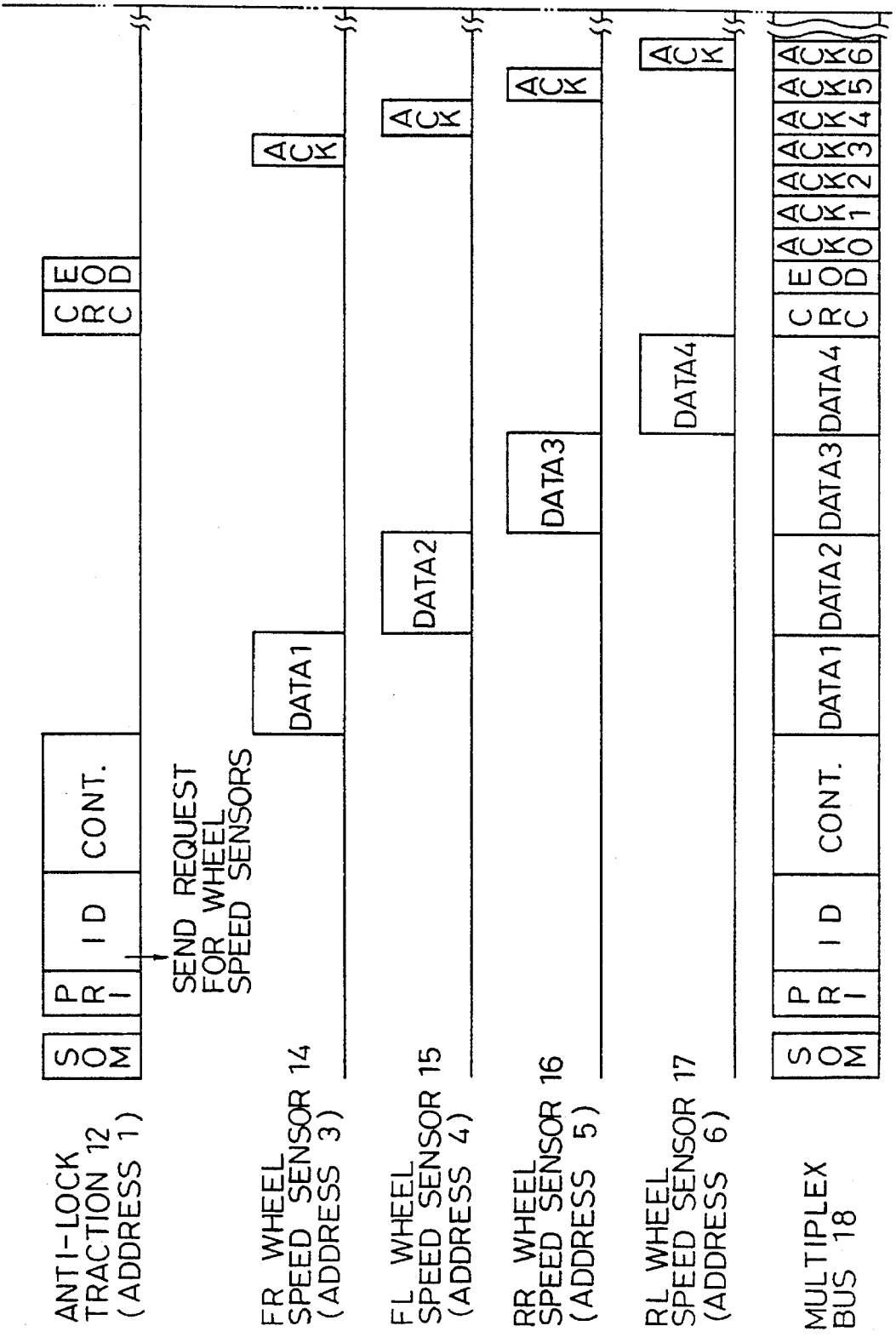

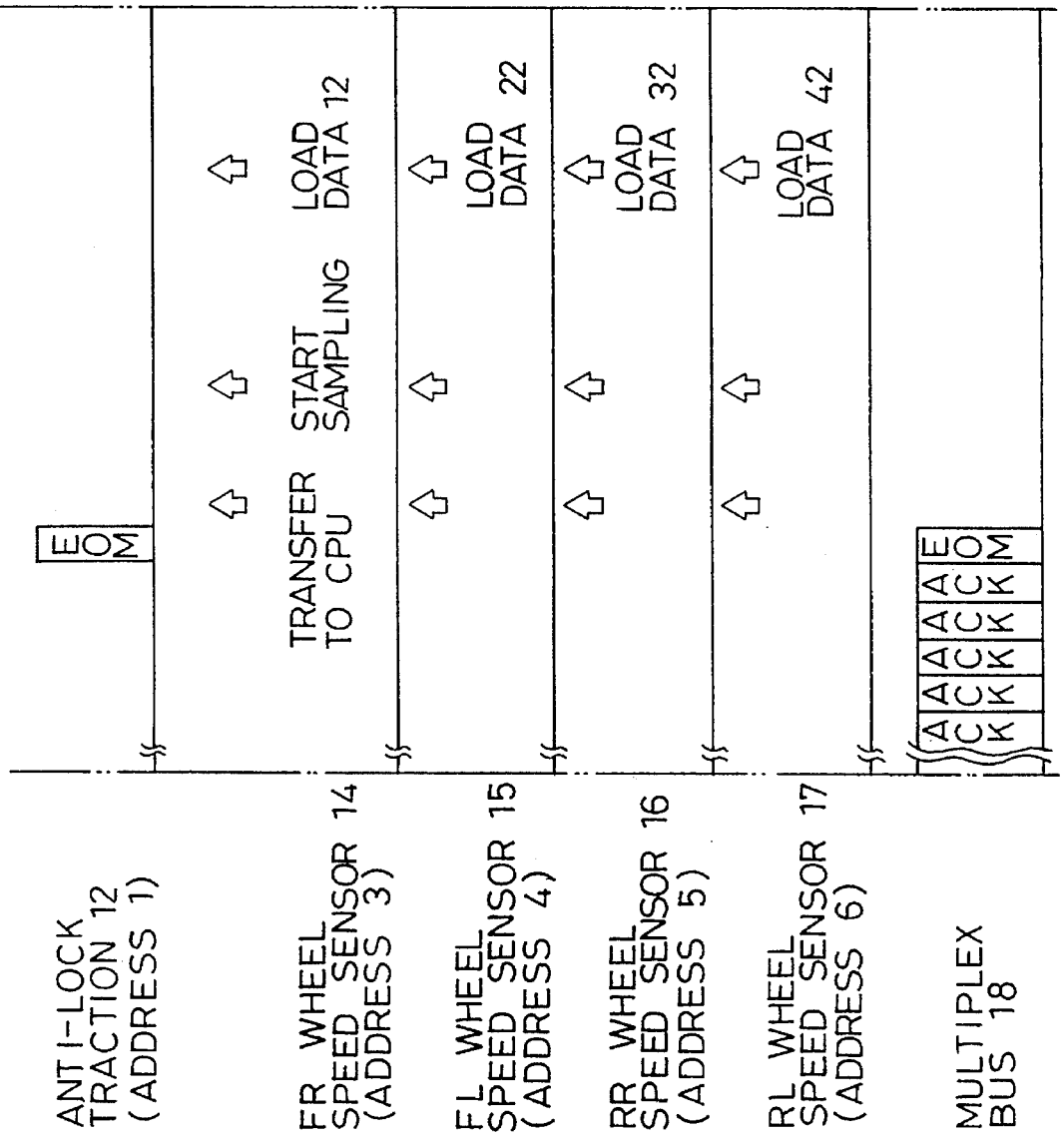

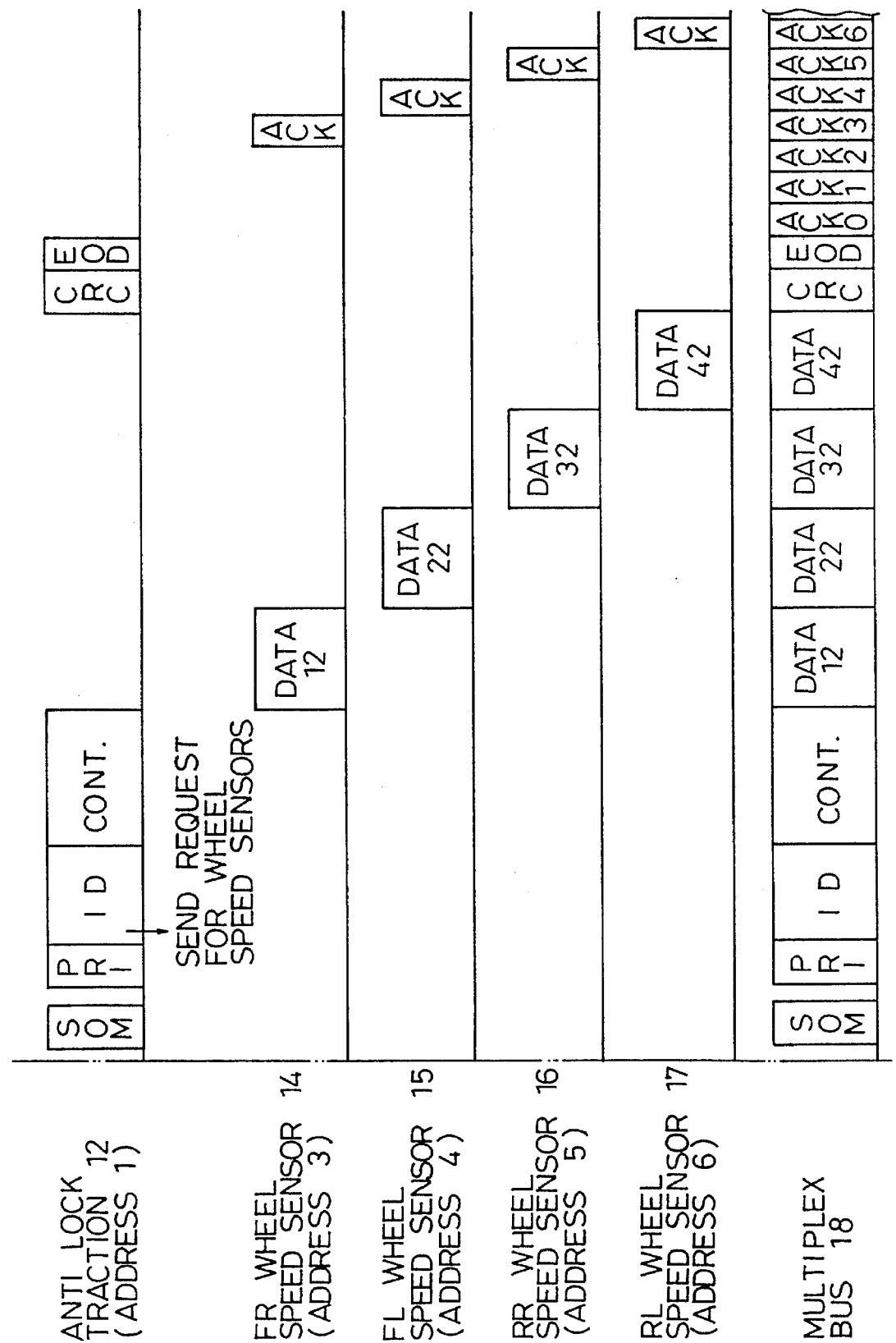

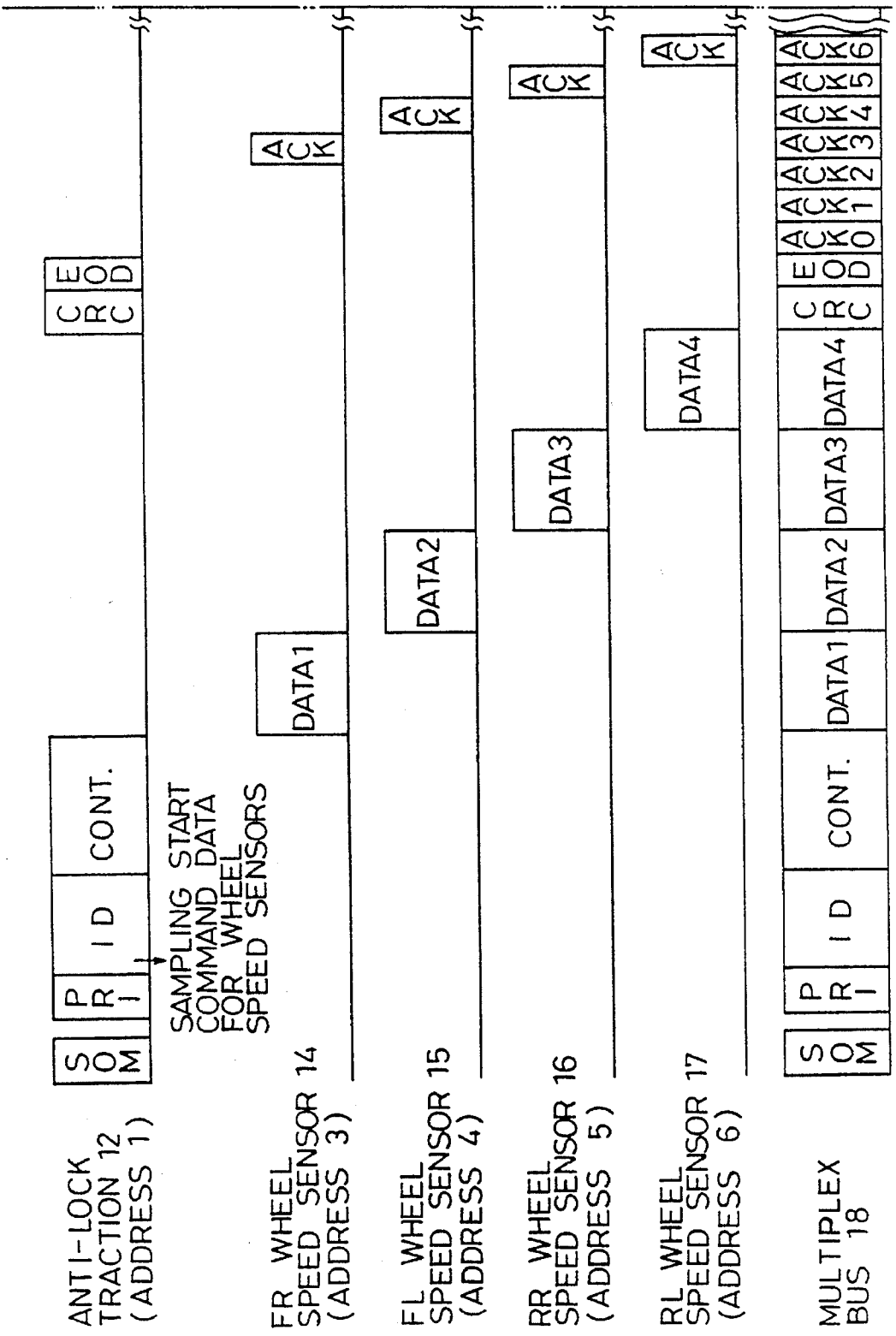

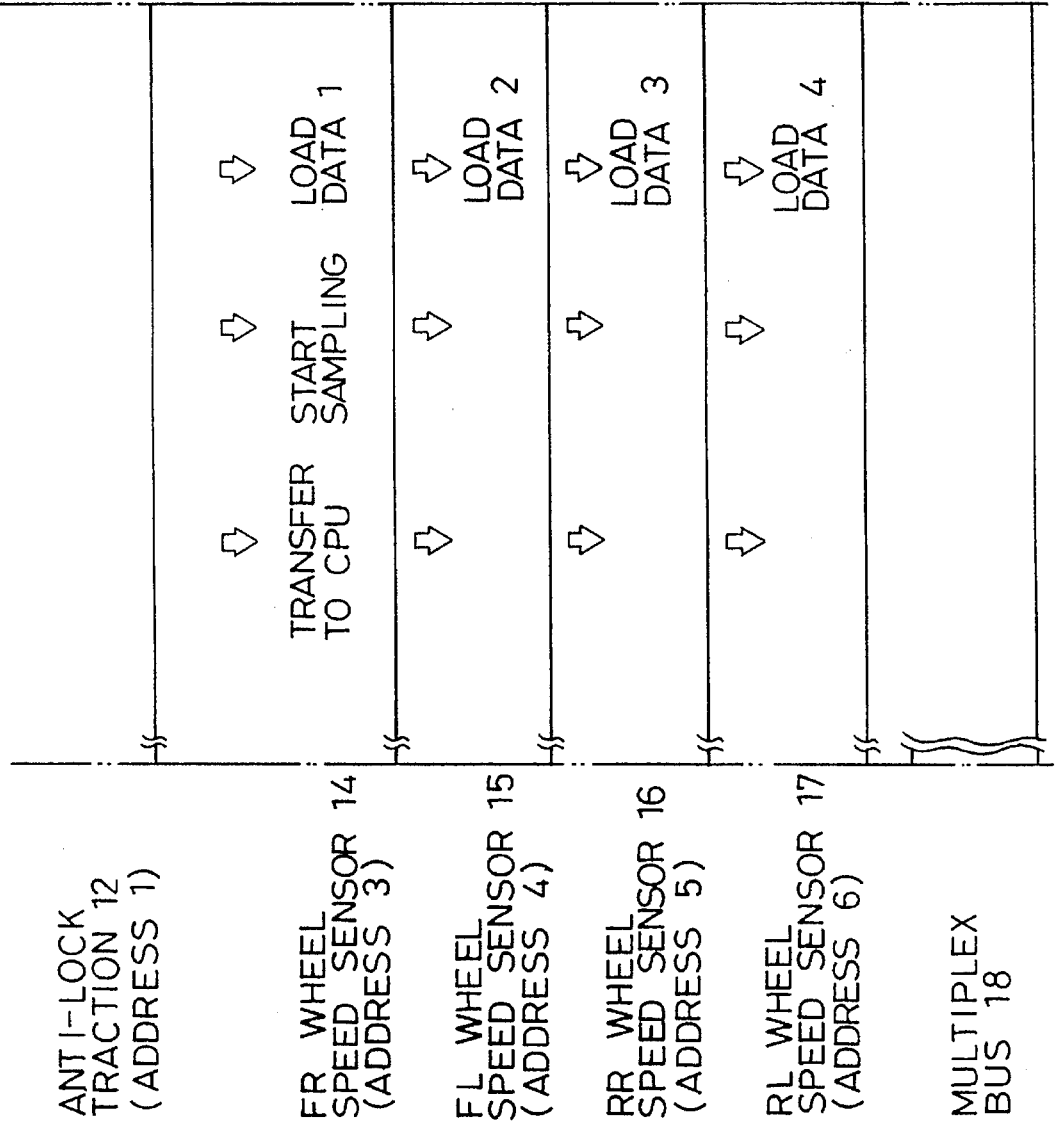

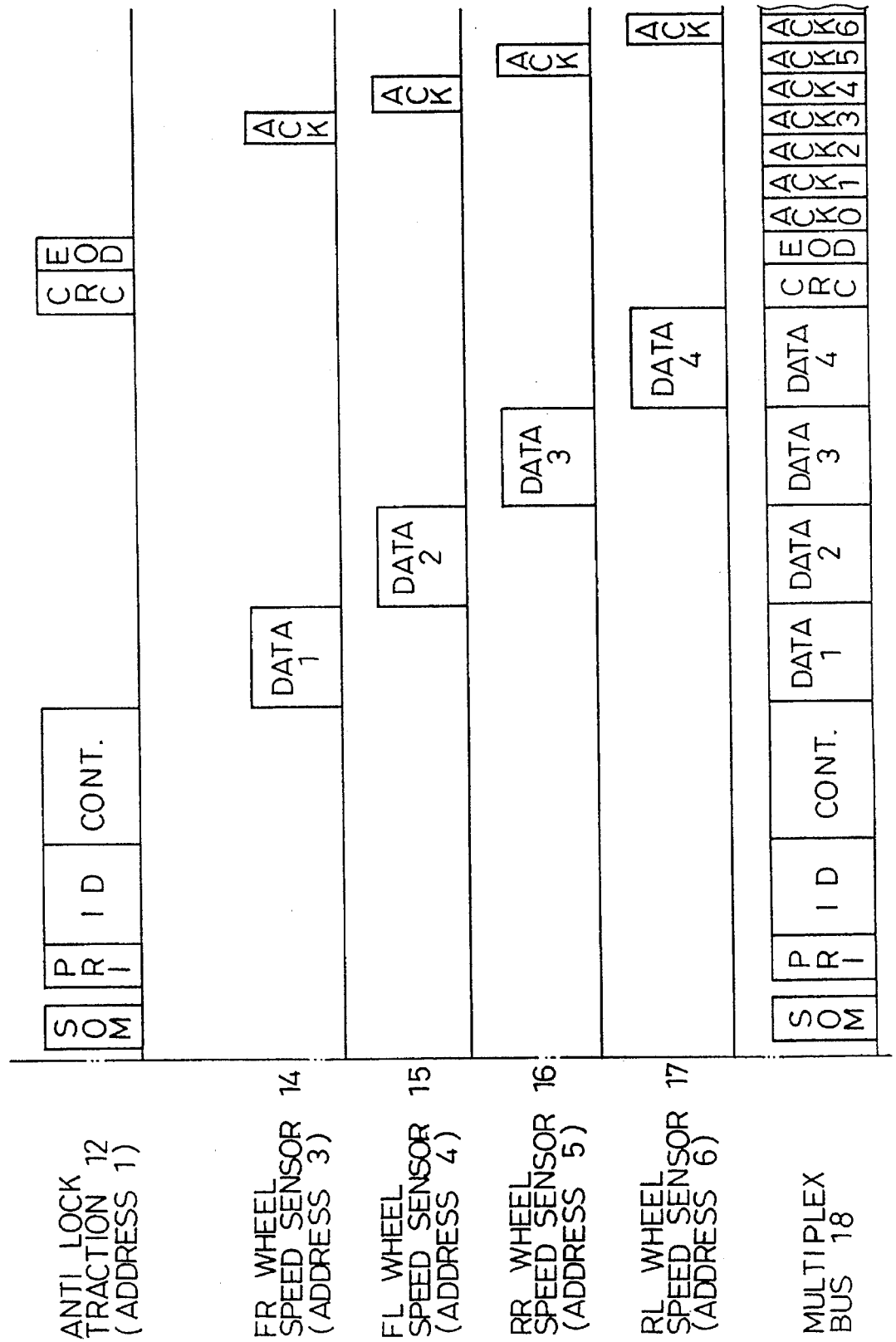

MULTIPLEX TRANSMISSION SYSTEM HAVING PLURALITY OF NODES AND COMMON TRANSMISSION LINE AND USING DIVIDED DATA AREAS

This application is a Continuation of application Ser. No. 07/861,324, filed Mar. 31, 1992, abandoned.

BACKGROUND OF THE INVENTION

1. Field of the Invention

This invention relates to a multiplex transmission system for carrying out a data transmission among a plurality of multiplex nodes connected to a common multiplex transmission line, and more particularly, to a multiplex transmission system using CSMA/CD (carrier sense multiple access/ collision detection).

2. Description of the Related Art

In conventional multiplex transmission systems of this type, a plurality of terminals (multiplex nodes) are connected to a common multiplex transmission line (multiplex bus) formed of, e.g., a paired cable. One of the multiplex nodes sends a predetermined data frame to the multiplex bus in accordance with the CSMA/CD method, to thereby transmit data simultaneously to the other multiplex nodes. The data frame includes an acknowledge signal (ACK signal) area at an end thereof.

In such systems, it is known that each of the multiplex nodes that received the data frame returns an ACK signal to a bit position of the ACK signal area preassigned thereto.

The multiplex nodes each include a computer for communication, and these computers are operated independently of one another and are able to send a data frame to the multiplex bus at a desired timing. Therefore, a collision of transmitted messages can occur on the multiplex bus, and conventionally this is prevented by setting a priority sequence for the transmission of individual messages.

In accordance with the priority sequence thus set, each computer sends a message therefrom while carrying out a priority control so that the message is not destroyed. Specifically, each computer carries out a data transmission according to a nondestructive arbitration type CSMA/CD access method in which the transmission of a message with a lower priority is automatically interrupted and only the higher-priority message is continuously transmitted. When the data is properly received, each multiplex node returns an ACK signal to a location of an address uniquely assigned thereto (respective bit area in the ACK signal area).

If a local error occurs in the network and the data received by a multiplex node is erroneous, then no ACK signal is returned from this multiplex node, and therefore, the sending multiplex node determines that an abnormal situation occurred, and retransmits the data. The sending multiplex node repeats the transmission of the data, e.g., three times at the maximum, until all of the registered multiplex nodes return their ACK signals.

A sending multiplex node uses an ACK management function, i.e., if a node fails to return the ACK signal even though the data transmission was repeated three times, such a node is regarded as being in trouble and is excluded from the registered nodes, and when an extra ACK signal is received, the node corresponding to this ACK signal is registered.

In the above-described multiplex transmission system, data transmitted from each multiplex node constitutes an independent frame, and therefore, where data from a plurality of multiplex nodes must be simultaneously transmitted to a certain multiplex node, the arrival times of individual frames vary significantly due to a variation in the delay times resulting from the traffic dependency. This phenomenon can cause a drawback in the case wherein an arithmetic operation must be carried out based on the received data to perform a different control on various devices. Namely, the intended control cannot be executed.

To eliminate this drawback, a time slot method in which data from a plurality of multiplex nodes is collected into one frame may be used. In this method, a synchronizing signal, such as a synchronizing pulse indicating a data boundary, must be generated by a specific node, and thus a centralized control system must be constructed. Therefore, this method cannot be applied to the case in which data obtained simultaneously from a plurality of multiplex nodes is used by a plurality of multiplex nodes to carry out a multifunction control. That is, a send request for collecting simultaneous data as required cannot be produced by an arbitrary multiplex node.

A CSMA/CD transmission system based on a bit-by-bit contention technique may be constructed in such a manner that a subnode sends data to a portion of the frame generated by a main node. Nevertheless, such a system has a problem of how to synchronize a plurality of multiplex nodes and how to carry out an error checking on the gathered data.

SUMMARY OF THE INVENTION

This invention was contrived in view of the above circumstances, and an object thereof is to provide a multiplex transmission system capable of collecting data simultaneously from a plurality of multiplex nodes constituting a network, and carrying out an accurate error checking on the collected data, to thereby enhance the efficiency of data transmission.

The above object is achieved by a multiplex transmission system of this invention which has a plurality of multiplex nodes interconnected by a common multiplex transmission line for transmitting a frame of data among the multiplex nodes through the multiplex transmission line, wherein a frame transmitted from a predetermined one of the multiplex nodes includes a data area previously divided into subdivided areas in accordance with data transmitted from the predetermined multiplex node and transmission data to be transmitted from the multiplex nodes in response to a send request, the transmission data being transmitted from the multiplex nodes to respective subdivided areas in a predetermined order.

In the multiplex transmission system of this invention, the predetermined multiplex node previously has information about the number of data pieces to be sent from the multiplex nodes in response to the send request and the number of bits of the individual data pieces. Therefore, the predetermined multiplex node divides the data area of a transmission frame in accordance with the data to be received, so that the multiplex nodes which received the send request send data to the respective subdivided areas in the predetermined order, to thereby carry out a data transmission. Accordingly, data can be collected simultaneously from the multiplex nodes which are functionally subordinate.

The above and other objects, features, and advantages of this invention will become more apparent from the ensuing detailed description taken in connection with the accompanying drawings.

BRIEF DESCRIPTION OF THE DRAWINGS

FIG. 13 and FIGS. 13(a)–13(c) are charts showing the data frame at different stages, for illustrating another transmission procedure for collecting simultaneous data in the multiplex transmission system according to this invention, and FIG. 13 shows the relative arrangement of FIGS. 13(a)–13(c); and FIG. 14 and FIGS. 14(a)–14(c) are charts showing the data frame at different stages, for illustrating still another transmission procedure for collecting simultaneous data in the multiplex transmission system of this invention, and FIG. 14 shows the arrangement of FIGS. 14(a)–14(c).

DESCRIPTION OF THE PREFERRED EMBODIMENTS

Figure 1:
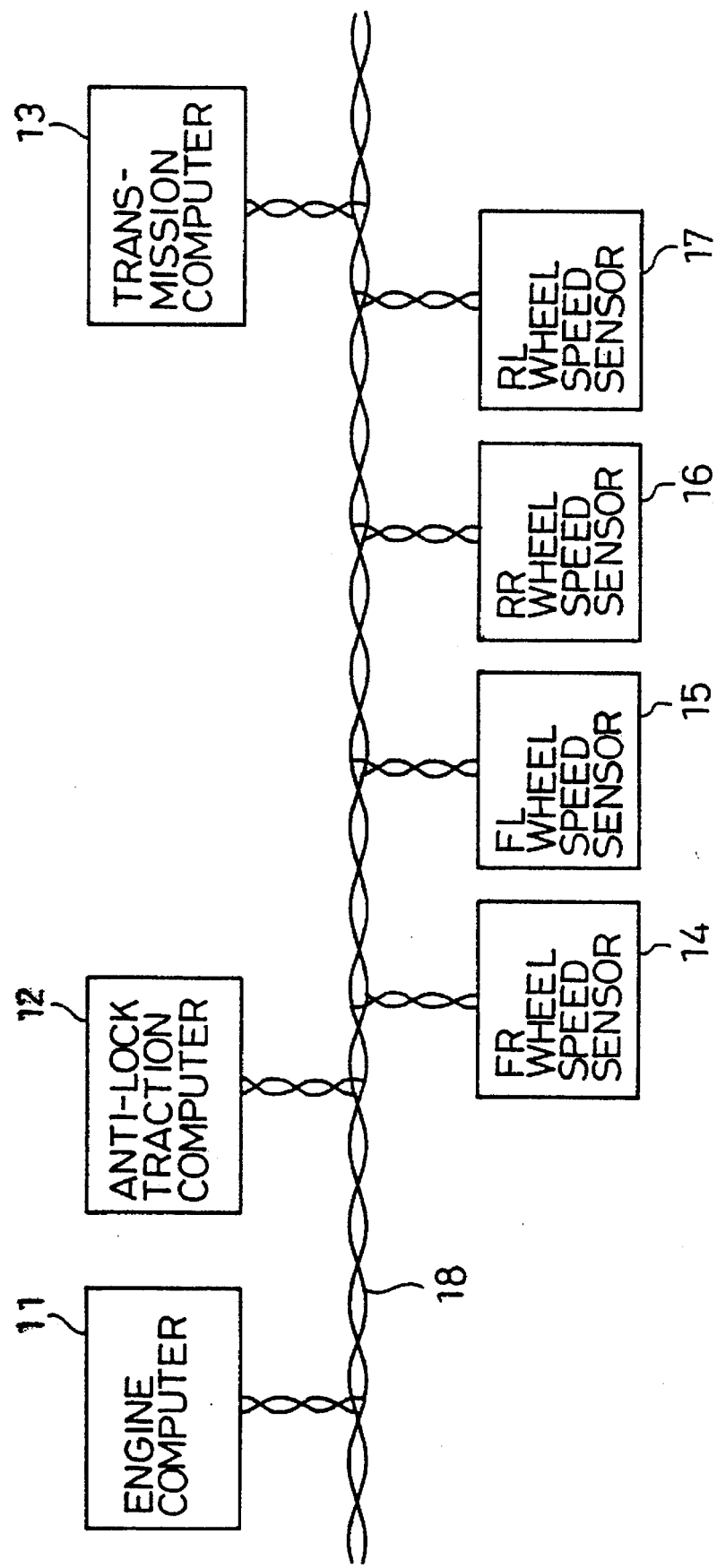
FIG. 1 is a diagram showing the arrangement of an automobile multiplex transmission system using a nondestructive arbitration type CSMA/CD method, according to this invention.

Referring to FIG. 1, a multiplex transmission system is installed in an automotive vehicle utilizing a nondestructive arbitration type CSMA/CD access system. This multiplex transmission system comprises a plurality of multiplex nodes including, e.g., an engine computer 11 for controlling the fuel injection quantity and ignition timing, an anti-lock traction computer 12 for controlling the driving force and the brake, a transmission computer 13 for controlling a transmission system, and wheel speed sensors 14 to 17 associated respectively with four wheels, i.e., a front-right (FR) wheel, a front-left (FL) wheel, a rear-right (RR) wheel, and a rear-left (RL) wheel; and a multiplex bus 18 formed of, e.g., a shielded twisted pair cable. These multiplex nodes 11 to 17 are interconnected by the multiplex bus 18 to constitute a network. In this network, signals representing wheel speeds etc. are transmitted serially in a multiplex mode.

Of these multiplex nodes, the wheel speed sensors 14 to 17 do not have a calculation function or a discrimination or determination function and are used only to carry out a communication with the individual computers 11 to 13, and therefore, these sensors are subnodes subordinate to the computers 11 to 13. The wheel speed sensors 14 to 17 supply signals representing the respective wheel speeds to the computers 11 to 13, and this information about the wheel speeds is used for a multifunction control involving the engine, anti-lock brake, transmission, etc.

Each of the multiplex nodes 11 to 17 is assigned a unique address; for example, the engine computer 11, anti-lock traction computer 12, and transmission computer 13 are assigned, respectively, addresses "0," "1" and "2," and the wheel speed sensors 14 to 17 for the FR, FL, RR and RL wheels are assigned addresses "3," "4," "5" and "6," respectively. When data is properly received, each of the multiplex nodes 11 to 17 returns an ACK signal to a bit area in an ACK signal area corresponding to the unique address thereof.

Figure 2:
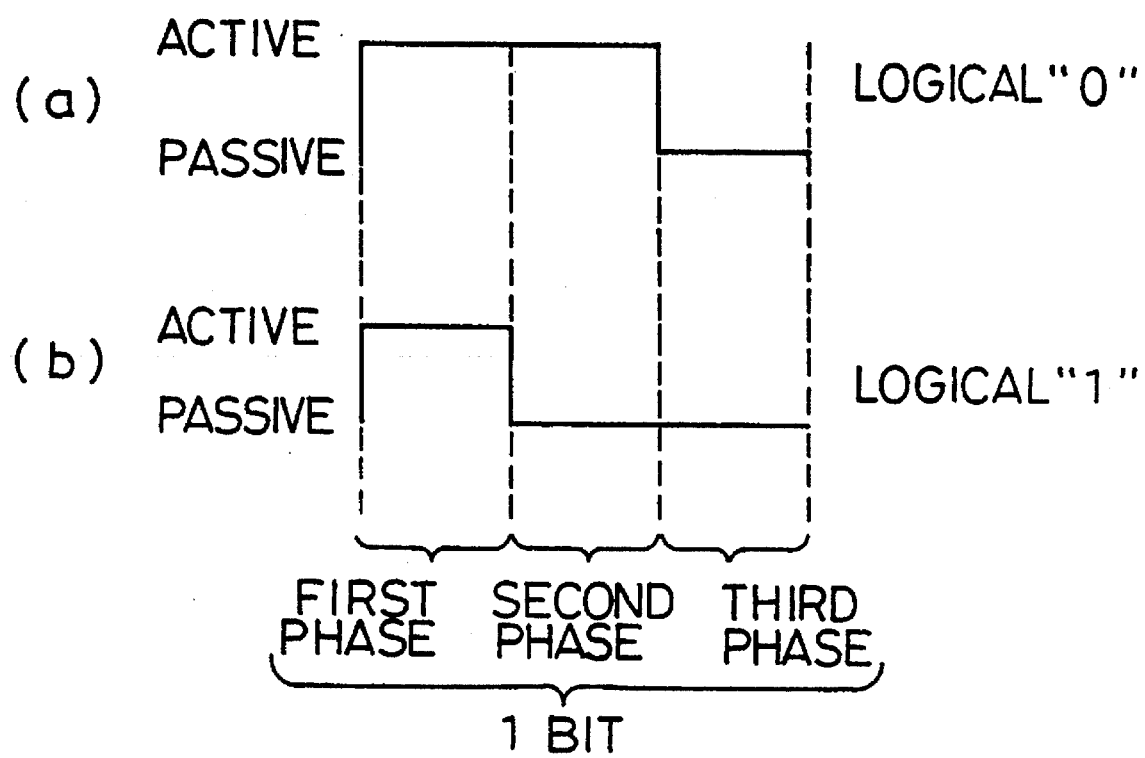
FIG. 2 is a diagram showing the structure of a PWM signal used as a transmission code in the multiplex transmission system.

The ACK signal area may be constituted by various transmission codes. An example is shown in FIG. 2, in which a PWM (pulse-width modulated) signal is used to facilitate the return and reception of the ACK signal by each multiplex node.

In the illustrated PWM signal, one logical bit is divided into three bit segments (hereinafter referred to as "phases"). First and third phases of the PWM signal have fixed levels, i.e., they have active and passive levels, respectively, and a second phase may have an active or passive level. Namely, when the second phase of the PWM signal is active, then it means logical "0," and when the second phase is passive, it means logical "1."

Accordingly, a sending multiplex node, which is the source of transmission of a data frame, sends to the multiplex bus an active signal at the first phase of each bit in the ACK signal area. When the data frame is properly received, each of the other receiving multiplex nodes detects the leading edge of the first phase of the bit assigned thereto, and at the same time renders the multiplex bus active and maintains the active state up to the second phase, so that the bit concerned indicates logical "0." On the other hand, when the data is not properly received, each of the receiving nodes does not set the multiplex bus active, though it detected the leading edge of the first phase of the bit assigned thereto, and therefore, the second phase becomes passive, which indicates logical "1."

It should be noted that the system configuration shown in FIG. 1 can be applied to various embodiments described hereinafter.

Figure 3:
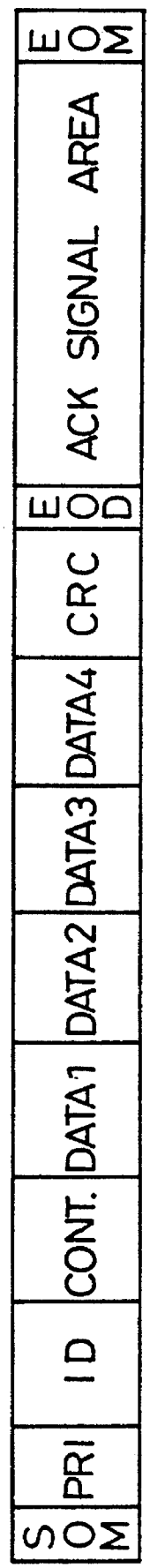
FIG. 3 is a diagram showing an example of a message format for a data frame.

The computers 11 to 13 are operated independently of one another and individually transmit a message shown in FIG. 3 to the multiplex bus 18 at respective desired timing.

As shown in FIG. 3, the data frame has a message format usually employed in the multiplex transmission system. Namely, the data frame includes an SOM (start-of-message) indicating the start of the message, a priority (PRI) used for determining a priority sequence when a plurality of multiplex nodes simultaneously send data, a message ID representing the contents of subsequent data (DATA), a control data area (CONT) including data representing the data length, data areas (DATA 1 to DATA 4) having a length (variable length) specified by the CONT, an error check code such as a CRC (cyclic redundancy check code), an EOD (end-of-data) indicating the end of the data, the aforesaid ACK signal area to which ACK signals are returned from all multiplex nodes on a bit-wise basis, and an EOM (end-of-message) indicating the end of the message.

Using this message format, a priority control is carried out without the possibility of destroying messages, in such a manner that the transmission of a message with lower priority is automatically interrupted whereas a higher-priority message is continuously transmitted. The computers 11 to 13 each have the ACK management function explained with reference to the prior art system.

This invention permits an efficient data collection in such a communication among the multiplex nodes. This embodiment will be described on the assumption that a message format shown in FIG. 4 is sent from the anti-lock traction computer 12 to the multiplex bus 18.

Figure 4:
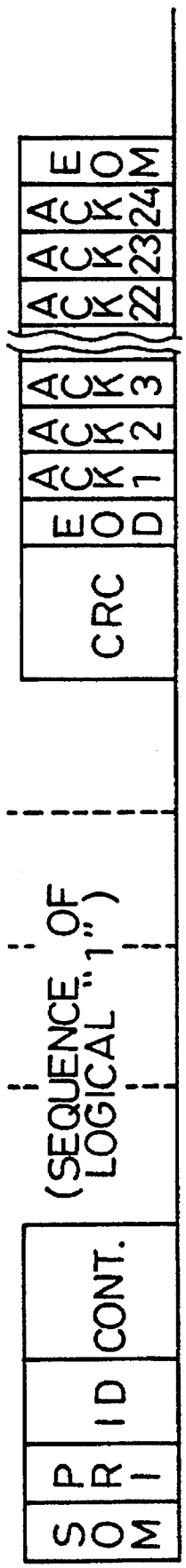
FIG. 4 is a diagram showing a message format for a data frame according to a first embodiment of this invention.

The message format for a data frame shown in FIG. 4 is almost the same as that shown in FIG. 3, but differs therefrom in that the data area is composed of a series of logical "1" bit areas (subdivided areas) previously divided corresponding to data to be transmitted from the multiplex nodes in response to the message ID representing a send request. For example, the anti-lock traction computer 12 previously recognizes that it will receive 1-byte data representing the wheel speed from each of the four wheel speed sensors 14 to 17. Accordingly, the anti-lock traction computer 12 sets the data length of each subdivided area to 4 bytes, and at the same time sets the sequence of reception of the wheel speed data from the sensors 14 to 17 to a sequence of FR, FL, RR and RL, which is identical with the sequence in which the ACK signals are returned.

Figure 5:
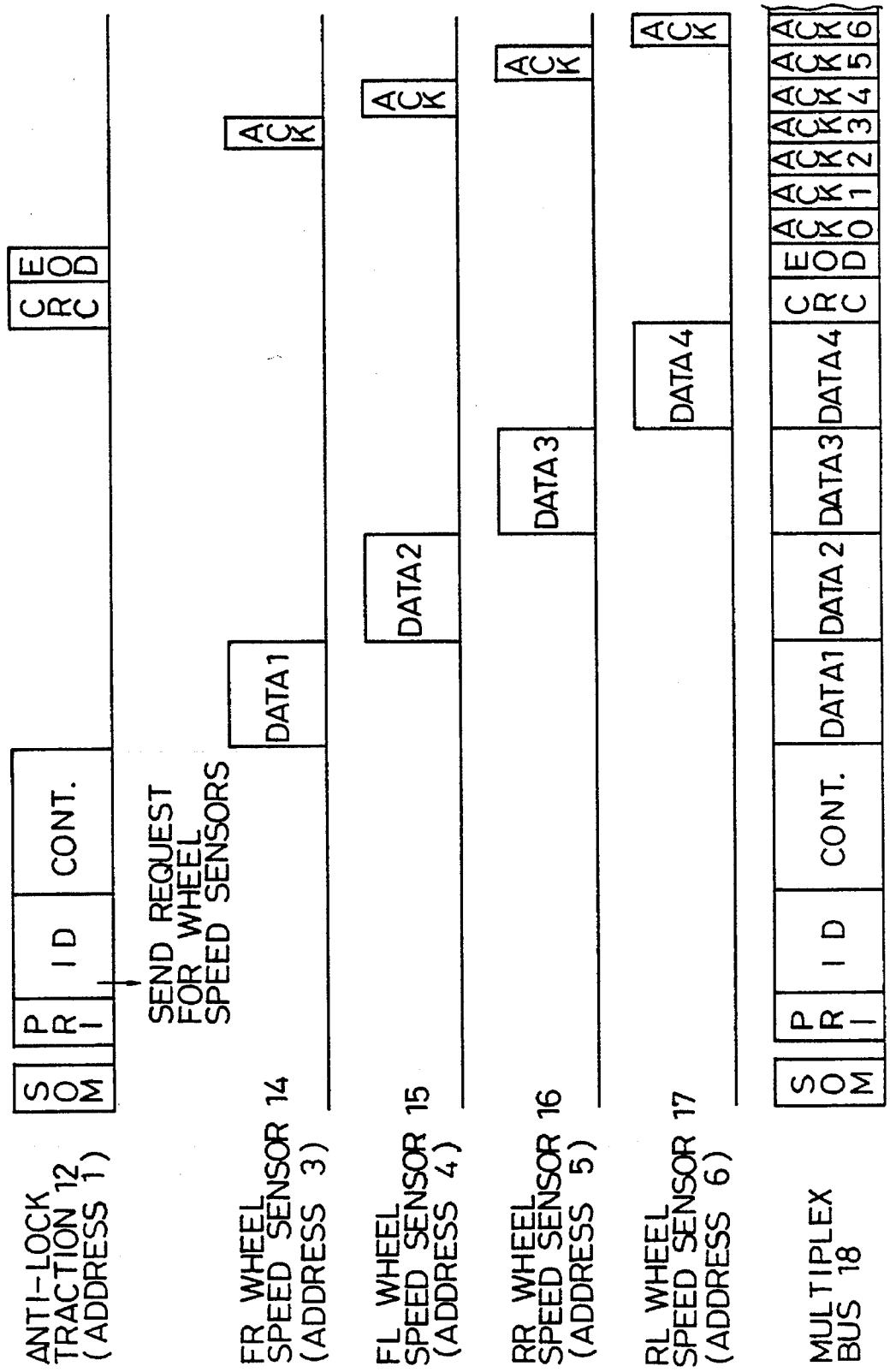
FIG. 5 is a chart showing the data frame at different stages, for illustrating a transmission procedure of the multiplex transmission system according to this invention.

FIG. 5 illustrates how the wheel speed sensors 14 to 17 send data to the respective subdivided areas of the data area in the order set as above.

Referring to FIG. 5, when the anti-lock traction computer 12, which is the sending multiplex node, is in need of the wheel speed signals to control the driving force and the brake, the computer 12 starts to send a message, as shown in FIG. 4, to the multiplex bus 18, together with an ID indicating a request to send the wheel speed signals. Subsequently, the anti-lock traction computer 12 sends control data to the multiplex bus 18. Since the anti-lock traction computer 12 is expected to be supplied with 1-byte wheel speed data from each of the wheel speed sensors 14 to 17, the control data is 4 bytes in length.

The wheel speed sensors 14 to 17, which are the receiving multiplex nodes, determine upon receiving the message ID that they are requested to send the wheel speed signals, and then stand by for the transmission for the required data.

Figure 6:
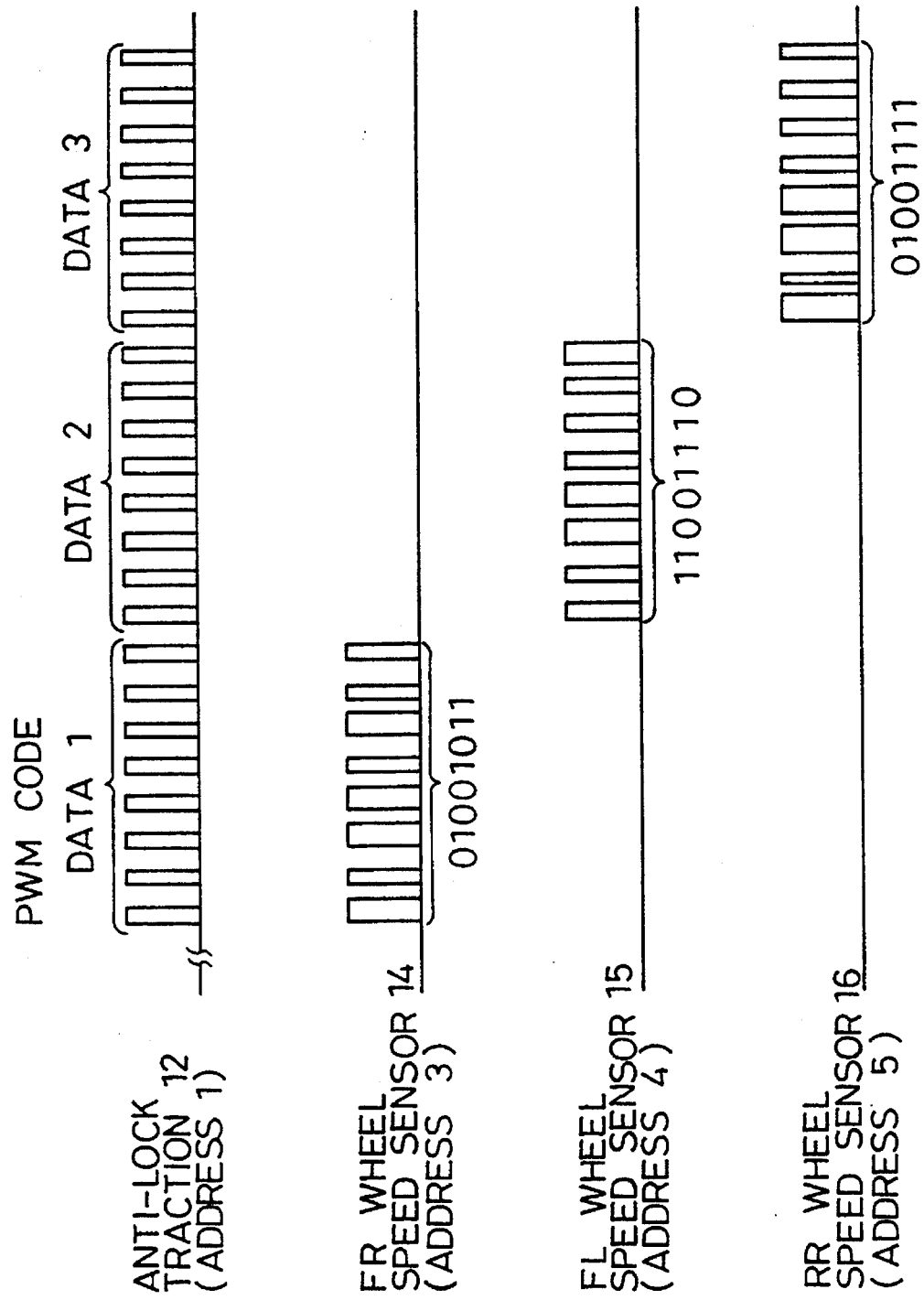
FIG. 6 is a chart showing how data is transmitted to the data area in the data frame shown in FIG. 5.

In this case, the transmission codes in the data area shown in FIG. 4 each comprise a PWM (pulse-width modulated) signal as shown in FIG. 2, like the transmission codes in the ACK signal area. Accordingly, in this data area, the anti-lock traction computer 12, which is the source of data frame transmission, successively sends active signals (representing logical "1"), of which the first phase of each bit is active, to the multiplex bus 18, as shown in FIG. 6. Each of the wheel speed sensors 14 to 17, which are the receiving multiplex nodes, detects the leading edge of the first phase of the respective subdivided area in the transmitted data frame, and sends data at least in the second phase in a manner timed with the active first phase. Thus, the synchronization of the individual multiplex nodes can be easily achieved.

Subsequently, the anti-lock traction computer 12 generates a CRC code on the basis of the transmitted data and transmits it in each of the PRI, ID, CONT, the subdivided area in which transmission data thereof is inserted, and the error cheek code. Further, the anti-lock traction computer 12 generates a CRC code on the basis of data to be received in each of the subdivided areas assigned to the other multiplex nodes, and sends the thus-generated CRC codes to the multiplex bus 18.

On the other hand, each of the wheel speed sensors 14 to 17 generates a CRC code on the basis of the received data including the PI, ID, CONT, the subdivided areas assigned to the other multiplex nodes, and the error cheek code. Further, each wheel speed sensor generates a CRC code on the basis of the data transmitted to the subdivided area assigned thereto. The wheel speed sensors 14 to 17 individually compare the generated CRC codes with the received CRC codes, and when they coincide, determine that the data transmission was carried out properly. In this case, the wheel speed sensors return ACK signals thereof, and the data transmission is ended. If, in any of the wheel speed sensors 14 to 17, the generated CRC codes do not coincide with the received CRC codes, such a wheel speed sensor determines that the data transmission was erroneously carried out, and therefore, does not return the ACK signal and waits for a retransmission of the frame.

When ACK signals are returned from all multiplex nodes, i.e., the wheel speed sensors 14 to 17, the anti-lock traction computer 12 determines that the data transmission was properly carried out, and ends the data transmission. The anti-lock traction computer 12 then controls the driving force and the brake in accordance with the received data. If any of the multiplex nodes fails to return the ACK signal, the anti-lock traction computer 12 determines that the data transmission was improperly carried out, and retransmits the frame.

As described above, in the multiplex transmission system of this invention, the data area of a frame to be transmitted is previously divided into a predetermined number of subdivided bit areas in accordance with data to be transmitted from a main multiplex node (sending multiplex node) and data to be transmitted from subordinate multiplex nodes (receiving multiplex nodes) which transmit data in response to a send request. Data is sent to these subdivided areas from the multiplex nodes in a predetermined order. Accordingly, the multiplex transmission system of this invention can simultaneously collect data from a plurality of multiplex nodes in a network. Further, in the multiplex transmission system of this invention, subordinate multiplex nodes each carry out an error checking, using the CRC code generated thereby on the basis of the data to be transmitted therefrom, the CRC codes generated thereby on the basis of the received data, the CRC code generated by the main multiplex node on the basis of the data transmitted therefrom, and the CRC codes generated by the main multiplex node on the basis of the reception data. Accordingly, the multiplex transmission system of this invention can carry out an accurate error checking. The simultaneous data collection and accurate error checking enable a further improvement in the efficiency of the data transmission.

This invention is not limited the above-described embodiment, and various modifications are possible. For example, the main-subordinate relationship may be established between the engine computer 11 or transmission computer 13 and the wheel speed sensors 13 to 17 for the data transmission.

Furthermore, this invention can be applied to a multiplex transmission system in which the node addresses are coded by a specific multiplex node, the ACK signal area is divided in accordance with the coded addresses, and when a message is properly received, the multiplex nodes return ACK signals to respective areas in the ACK signal area specified by the coded addresses.

Figure 7:
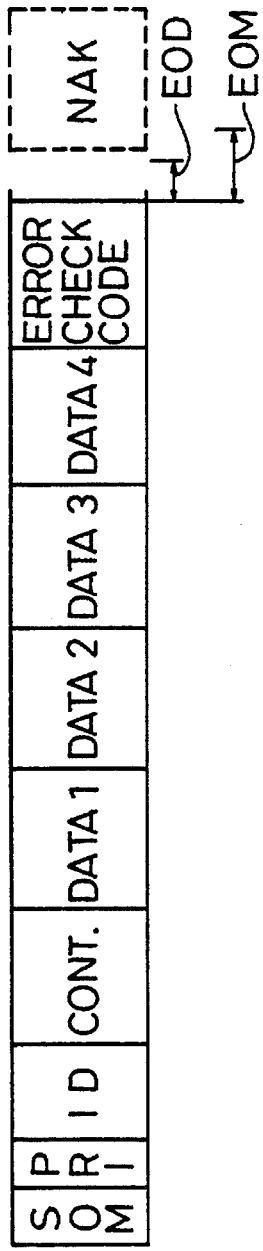
FIG. 7 is a diagram showing a message format for a data frame according to a second embodiment of this invention.

Further, this invention can be applied to a negative acknowledge system in which a predetermined signal, instead of the ACK signals, is transmitted when an erroneous data reception occurred due to, e.g., a reception error in any one of the connected nodes. For example, a CRC code generated by one of the receiving multiplex nodes, i.e., the wheel speed sensors 14 to 17, may not coincide with the CRC code transmitted from the anti-lock traction computer 12 which is the sending multiplex node. In such a case, the receiving multiplex node concerned sends a negative acknowledge signal (NAK signal), which is a special code longer in time than the EOD code and shorter than the EOM code (see the message format for data frame shown in FIG. 7), to the multiplex bus 18 after the error checking, to thereby request the sending multiplex node to retransmit the frame. Thus, in the multiplex transmission system of this invention, the sending multiplex node can readily determine whether or not a frame retransmission is required, on the basis of the presence or absence of the NAK signal.

Figure 8:
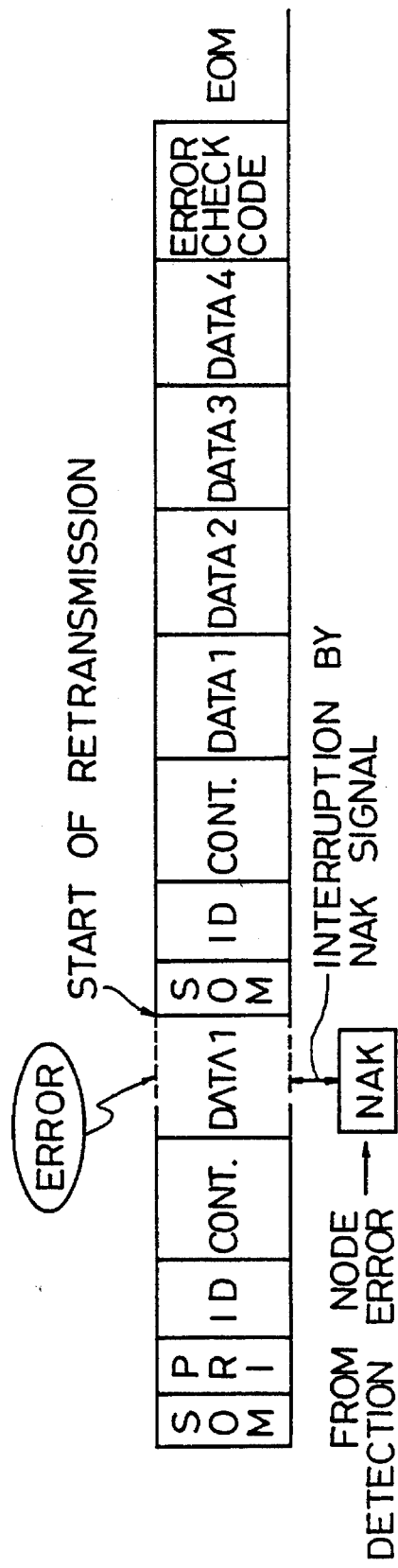
FIG. 8 is a diagram showing a message format for a data frame according to a third embodiment of this invention.

FIG. 8 shows a message format for data frame used for the negative acknowledge system, according to a third embodiment of this invention. Usually, the NAK signal is a priority code which is transmitted preferentially over any other codes even in the case of a collision occurring on the multiplex bus. Therefore, if a receiving multiplex node detects a waveform not conforming to the logical "0" or "1" during the data reception, for example, it sends a NAK signal to the multiplex bus even when the sending multiplex node is transmitting data. In such a case, the NAK signal collides with the data being transmitted via the multiplex bus, but the NAK signal is predominant on the multiplex bus. Accordingly, the sending multiplex node detects the NAK signal, which is the priority code, and thus interrupts the ongoing transmission and starts a retransmission of the frame. In this multiplex transmission system, normal data transmission can be readily recovered by using the priority code, i.e., the NAK signal.

This invention is not limited to the foregoing embodiments, and can be applied to an NRZ (nonreturn-to-zero) system using an NRZ code, instead of the PWM code, for the transmission code in the message.

In the case of a coding scheme using the NRZ code, a stuffing bit rule in which a 1-bit inverted code is inserted when a plurality of preceding codes (e.g., 5 bits) are identical is employed to achieve synchronization. Therefore, if in any of the subdivided areas of the data area, the stuffing bit rule is violated (e.g., 8-bit subdivided area in the case of a 5-bit stuffing rule) and if a subnode becomes defective, a stuffing bit error occurs because no signal is delivered from this node to the subdivided area assigned thereto, thus arising a problem in that data from the other normally operating nodes cannot be received.

Figure 9:
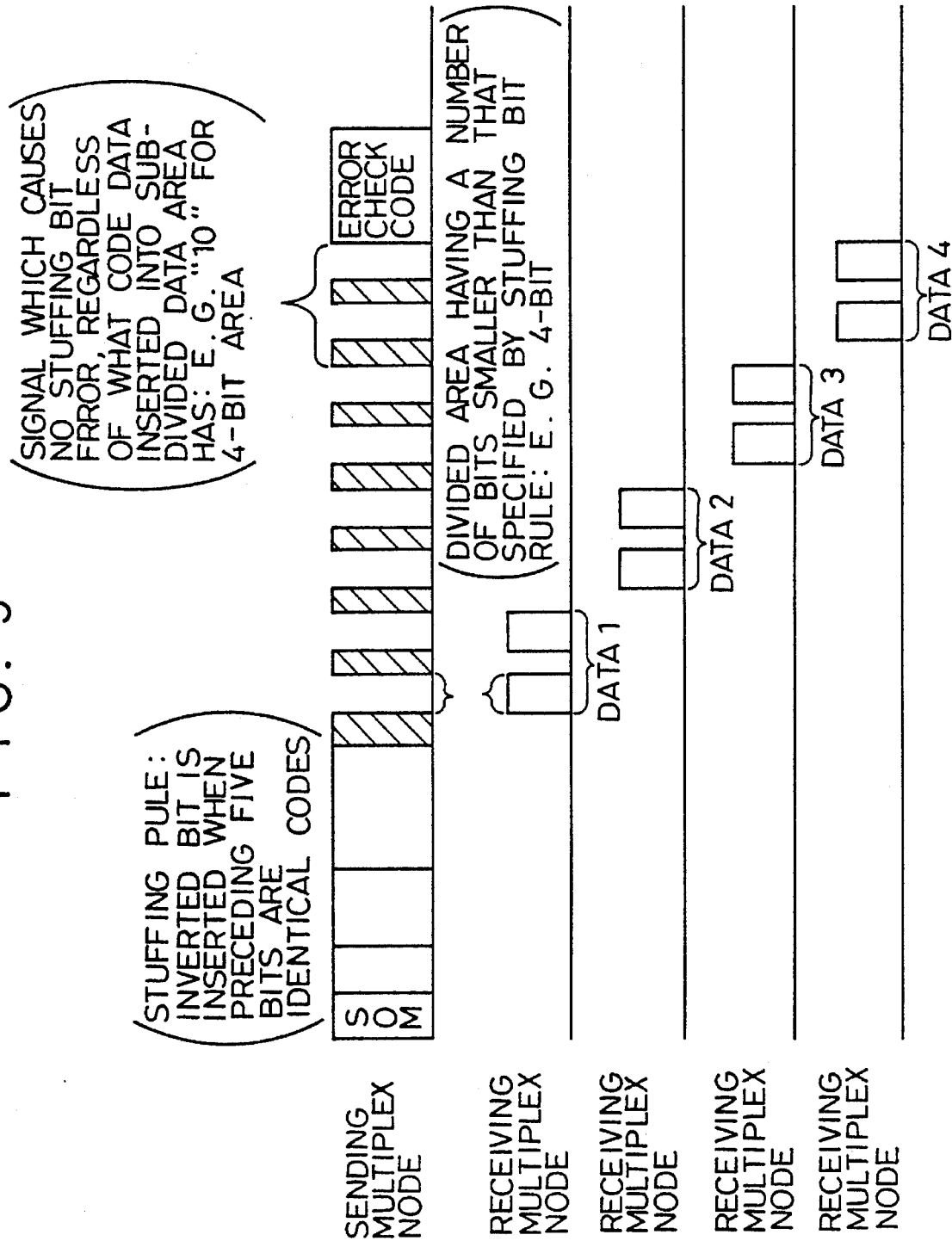
FIG. 9 is a chart showing the data frame at different stages, for illustrating another transmission procedure of the multiplex transmission system in which an NRZ code is used as the transmission code.

Therefore, according to this invention, the sending multiplex node previously divides the data area of a transmission frame into a plurality of subdivided areas each having a number of bits smaller than that provided by the stuffing bit rule (e.g., 4 bits for the 5-bit stuffing rule), in accordance with the data to be transmitted therefrom and data to be supplied thereto from the individual multiplex nodes in response to the send request, as shown in FIG. 9. The signal which is delivered from the sending multiplex node for dividing the data area is selected such that it does not cause a stuffing bit error, regardless of what value the data inserted into the subdivided areas has (for a 4-bit subdivided area, 1-bit passive+ 1-bit dominant signal, for example). Upon receiving the transmission frame, each receiving node divides data and sends same to the subdivided areas preassigned thereto in synchronism with the signal dividing the data area.

In the multiplex transmission system of this invention, synchronization is achieved by delivering the signals to divide the data area, without violating the stuffing bit rule, and accordingly, the insertion of data into the data area is made easy.

Next, a message format for data frame according to another embodiment, which is used when the NRZ code is used for the transmission code, will be described. In this case, the NRZ system employs a 5-bit stuffing rule, and in the data area the synchronous mode is switched from the stuffing mode to a start-stop mode in which the stuffing rule is not violated, to achieve synchronization. Specifically, as shown in FIG. 10, 8 bits in the data area, for example, are divided into two parts, 4 bits each, and the sending multiplex node transmits a 1-bit dominant signal following passive 5 bits.

A transmission procedure of this embodiment will be described.

Figure 10:
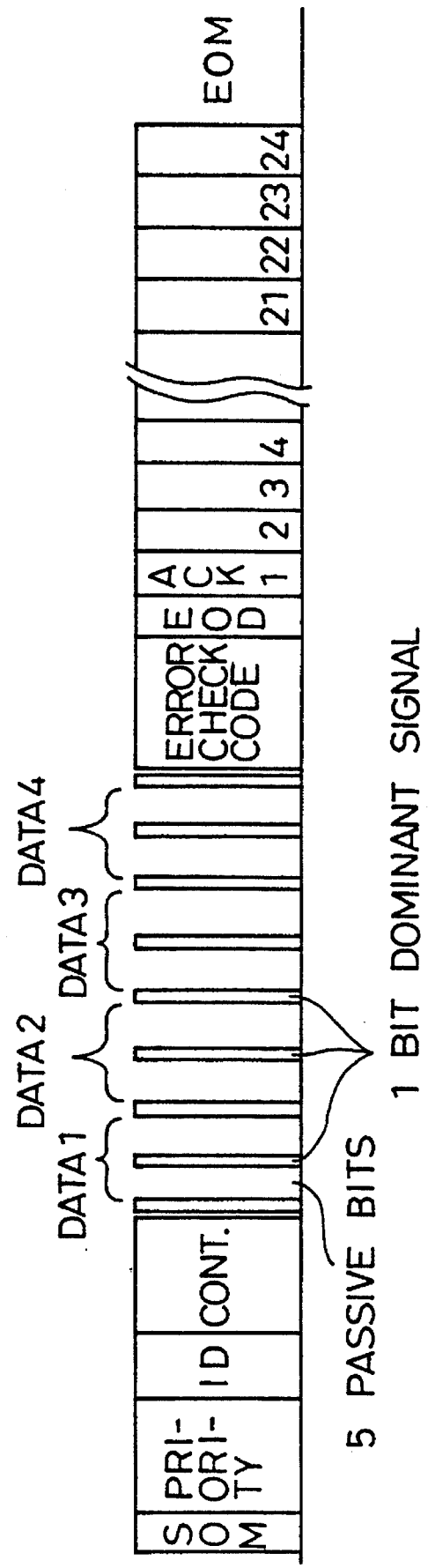
FIG. 10 is a diagram showing a message format for a data frame according to a fourth embodiment of this invention.

When the wheel speed signals are needed for some control operation, the anti-lock traction computer 12, which is the sending multiplex node, starts to transmit a message as shown in FIG. 10, with an ID requesting the transmission of the wheel speed signals, to the multiplex bus 18.

Upon receiving this message ID, the four wheel speed sensors 14 to 17, which are the receiving multiplex nodes, determine that the transmission of the wheel speed signals is required, and thus start the preparation of the required data for transmission.

Further, the anti-lock traction computer 12 sends the control data to the multiplex bus 18. The sending node previously recognizes that a wheel speed signal consisting of 1-byte data is to be supplied from each of the four nodes, and therefore, the data length is specified as 4 bytes.

If the order of data transmission from the wheel speed sensors is previously determined as the FR wheel speed sensor 14, FL wheel speed sensor 15, RR wheel speed sensor 16 and RL wheel speed sensor 17, the anti-lock traction computer 12 is supplied with data successively from these wheel sensors in this order.

In this case, since the anti-lock traction computer 12 sends a 1-bit dominant signal subsequent to each 5-bit passive area, those nodes which are requested to send data (in the illustrated case, the wheel speed sensors 14 to 17) each detect the data area from the leading edge of the corresponding predetermined dominant signal for synchronization, send data to the first four bits in the subsequent 5-bit passive area, and then send the remaining 4-bit data to the 5-bit passive area following the next 1-bit dominant signal. Following the subsequent 1-bit dominant signal transmitted from the anti-traction computer 12, the next wheel speed sensor sends data in a similar manner, whereby data is successively collected.

Figure 11:
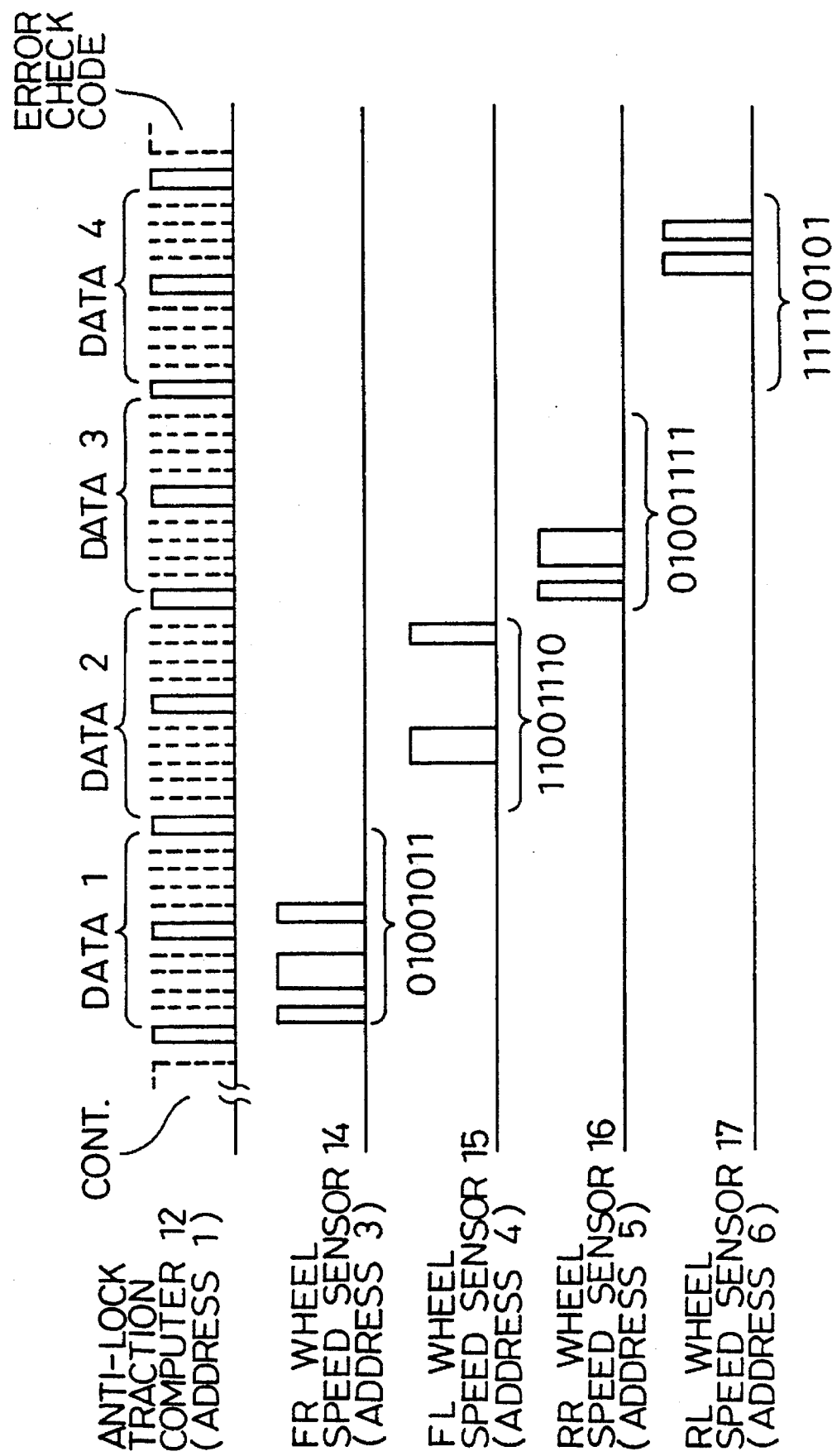
FIG. 11 is a chart showing the data frame at different stages, for illustrating a transmission procedure of the multiplex transmission system using the NRZ code for the transmission code, according to this invention.

Accordingly, each receiving multiplex node can be synchronized with the rise of the predetermined dominant signal, to transmit local data therefrom in two sessions, 4 bits each, to the multiplex bus 18. If one of the receiving multiplex nodes, e.g., the FR wheel speed sensor 14, becomes defective, no data is transmitted from this FR wheel speed sensor 14 to the area DATA 1 in FIG. 11, but since the anti-lock traction computer 12 sends a 1-bit dominant signal after each 5-bit passive area, a stuffing bit error does not occur and the transmission of subsequent data can be carried out. Trouble of the individual receiving multiplex nodes can be determined on the basis of the absence of the corresponding ACK bits.

In this embodiment, the sending multiplex node transmits a 5-bit passive signal plus a 1-bit dominant signal in the data area, but the numbers of bits of the passive and dominant signals are not limited to these numbers and may be set to different values as far as the stuffing bit rule is observed.

Further, in the foregoing embodiments, only the transmission procedure for the multiplex transmission system is described. In the case wherein the multiplex transmission system of tills invention is in practice used for the control of the driving force etc. of an automobile, the control precision must be enhanced. To meet this requirement, sampling times for data collected from various sensors and the like by an SDG (Simultaneous Data Gathering) method also must be synchronized. The most preferred method for achieving such a synchronization may be such that each node detects the send request upon receiving an SDG message ID in a frame, samples the required data from the sensor or the like, and sends the sampled data to the data area of the same frame.

In this method, however, processes from the start of sampling to the transmission of the sampled data must be completed within a narrow span in one frame, e.g., within the CONT area in the frame shown in FIG. 10. Therefore, this method has a drawback in that it can be applied only to a system configuration in which both sampling of transmission data and communication control can be implemented by the hardware of each node and the data sampling can be carried out at a very high speed.

Figure 12:
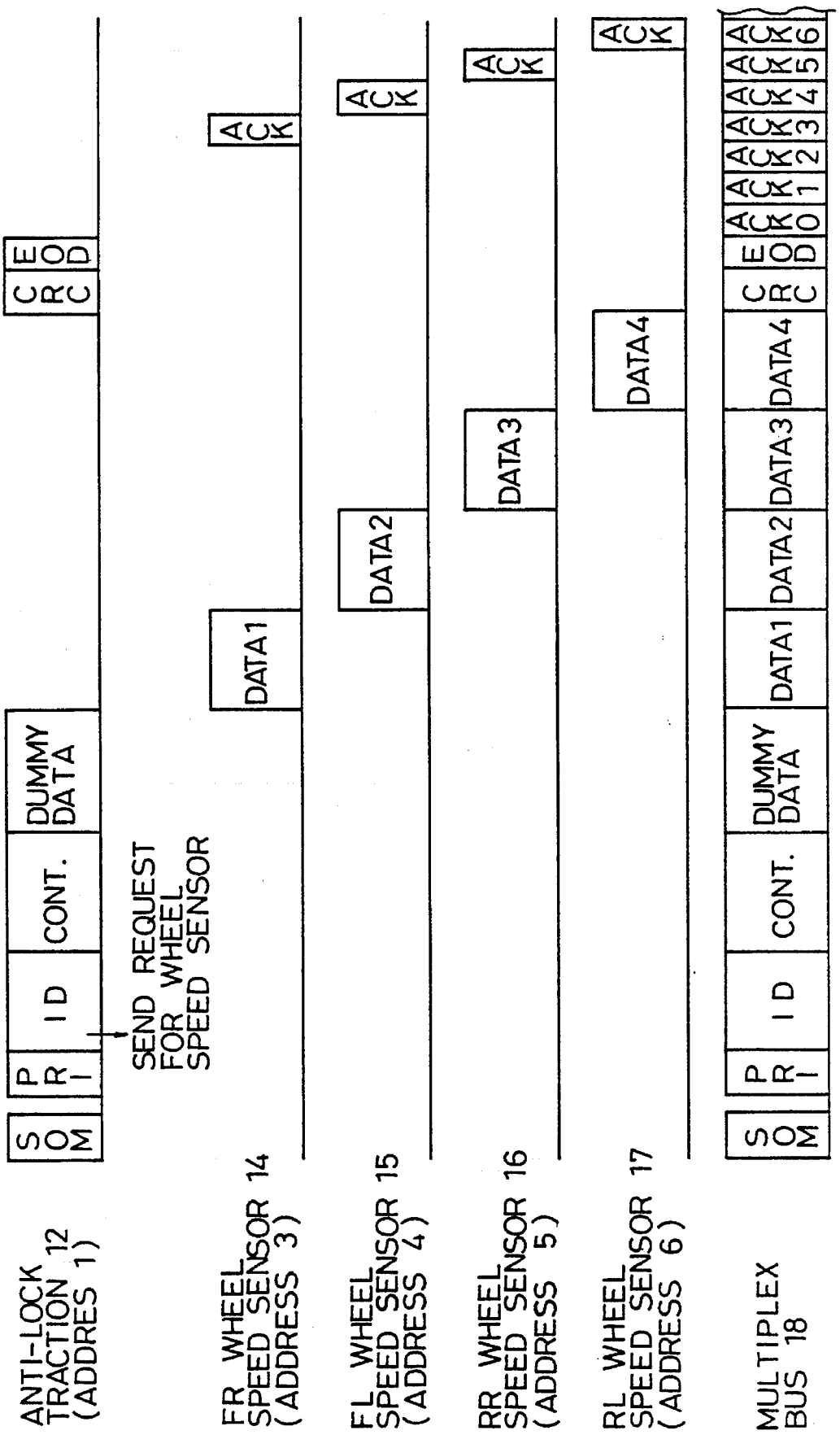
FIG. 12 is a chart showing the data frame at different stages, for illustrating a transmission procedure for collecting simultaneous data in the multiplex transmission system according to this invention.

In view of the above, this invention provides a multiplex transmission system in which a dummy data area having a predetermined length is provided between the CONT and data area in a transmission frame, to permit the data sampling and the writing of the sampled data to be carried out while the CONT and the dummy data area are being transmitted, as shown in the transmission procedure of FIG. 12. In the multiplex node of an actual system, the sampling of the required data is carried out by a control circuit, and the communication control is executed by a communication control circuit comprising an integrated circuit or the like. The message format for data frame shown in FIG. 12 is similar to that shown in FIG. 4 or FIG. 10, and message formats shown in FIGS. 13 and 14, described hereinafter, are also similar to the message format of FIG. 4 or FIG. 10.

Referring to FIG. 12, in each of the receiving nodes (in the illustrated case, the FR, FL, RR and RL wheel speed sensors 14, 15, 16 and 17), the communication control circuit receives the SDG message ID in a message transmitted from the sending multiplex node (the anti-lock traction computer 12), and the control circuit detects the send request from the message ID.

Upon detecting the send request, the control circuit of each of the above multiplex nodes samples the required data from a load (sensor) connected thereto, through an analog-to-digital converter, a pulse counting circuit, etc. The control circuit writes the sampled data into a predetermined register or the like in the communication control circuit. The sampling and writing of the data is carried out by the control circuit during a time in which the CONT and the dummy data area having the predetermined length are transmitted. The dummy data area may contain any data from which each multiplex node can determine that the data concerned is dummy, and the length thereof may be set to a suitable length in accordance with the time required for the control circuit to sample and write data.

Upon receiving the dummy data, each communication control circuit successively sends the data, which is written into the register, to the predetermined data area in the transmission frame.

Accordingly, in this embodiment, since the dummy data area permitting data sampling is provided in the transmission frame, the simultaneity of the times for sampling data at the multiplex nodes can be ensured where data must be collected simultaneously.

The data sampling for controlling the driving force etc. of an automobile is usually carried out at predetermined intervals of time. For such an application, this invention provides a multiplex transmission system in which the sampling and writing of data is carried out after the frame requesting a data transmission is received and before a subsequent frame is transmitted to the multiplex bus 18, as shown in the transmission procedure of FIGS. 13(a)–13(c). The data which is written into the register is transmitted to the frame requesting a data transmission to be transmitted at the next intervals of time.

In FIGS. 13(a)–13(c) upon receiving the SDG message ID of a frame transmitted from the sending multiplex node, the communication control circuit of each of the multiplex nodes 14 to 17 successively transmit the data stored in the register (in the illustrated embodiment, DATA 11, DATA 21, DATA 31 and DATA 41) to the data area in this frame. The communication control circuit then detects the end of the reception of the frame (EOM), and supplies data representing the end of reception of the frame to the control circuit.

On receiving this data, the control circuit samples the required data to be transmitted in the subsequent transmission frame. The control circuit writes the sampled data into the predetermined register of the communication control circuit before the transmission of the subsequent frame begins. This data is sent to the data area of the subsequent frame by the communication control circuit when the SDG message ID in the frame is received.

Thus, in this embodiment, since the data to be transmitted in the subsequent frame is sampled after the end of the reception of the preceding frame, data having simultaneity can be easily collected by means of frames transmitted at relatively short intervals.

In the above transmission method, if the frames are transmitted at relatively long intervals, the time period from the data sampling to the transmission of the sampled data is prolonged, and thus the sampled data may become so outdated that a delay of the control action can be caused. According to this invention, this drawback is eliminated by limiting the time period between the reception of the request in the SDG message ID and the start of the data sampling, as shown in the transmission procedure of FIGS. 14(a)–14(c). Namely, in the case wherein frames are transmitted at relatively long intervals or at random times, the sampling and writing of data to be transmitted in the subsequent transmission frame is carried out during the preset time period.

In FIGS. 14(a)–14(c), the sending multiplex node, which requests a data transmission, sends start command data for starting the data sampling, before transmitting the frame concerned, and after the lapse of a time T, sends the transmission frame to the multiplex bus 18. In this embodiment, the start command data is the message ID of a frame preceding the above transmission frame.

Upon receiving the SDG message ID in the frame transmitted from the sending multiplex node, the communication control circuit of each of the multiplex nodes 14 to 17 successively sends the data stored in the register, not shown, to the data area in the frame. Further, the communication control circuit supplies data indicating the reception of the message ID to the control circuit upon lapse of a predetermined time t after the reception of the message ID. The predetermined time t lasts beyond the time at which the reception of the transmission frame is ended, and is shorter than the aforementioned time T.

Upon receiving the data indicating the reception of the message ID, the control circuit samples data to be transmitted to the subsequent frame, and then writes the sampled data into a predetermined register in the communication control circuit before the subsequent frame is transmitted. When the message ID of the subsequent frame is received, the communication control circuit sends the stored data to the data area in that frame.

In this embodiment, the start command data is transmitted from the sending multiplex node, but this invention is not limited to such a configuration. For example, the start command data may be sent from another multiplex node, and in this case, the start command data having a frame format must be sent when the multiplex bus 18 is in an idle state.

In this embodiment, since data to be transmitted in response to the subsequent send request is sampled upon lapse of the predetermined time after the reception of the start command data, simultaneous data can be collected by means of frames which are transmitted at relatively long intervals, and the delay of control action can be eliminated.

What is claimed is:

1. A multiplex transmission system comprising:
   multiplex transmission lines; and
   a plurality of multiplex nodes which are interconnected with said multiplex transmission lines, and which transmit a frame of data to each other;
   at least a predetermined one of said multiplex nodes transmitting said frame of data which includes an identifier indicative of a send request of data and a data area following said identifier; and
   said data area being divided into subdivided areas, each of said subdivided areas being assigned to a multiplex node specified by said identifier;
   each of said plurality of multiplex nodes transmitting data of the respective multiplex nodes to the data area assigned to the respective multiplex nodes in said frame of data only when said frame of data includes an identifier indicative of a send request to the respective multiplex nodes.

2. A multiplex transmission system according to claim 1, wherein said frame of data further includes an acknowledge signal area, the multiplex nodes each returning a positive acknowledge signal to the acknowledge signal area in a predetermined order when data is properly received, and the predetermined multiplex node determining whether or not data transmission was properly carried out, in accordance with the returned positive acknowledge signals from each multiplex node.

3. A multiplex transmission system according to claim 2, wherein the multiplex nodes each return a negative acknowledge signal when data is not properly received, the predetermined multiplex node determining whether or not data transmission was properly carried out, in accordance with a presence/absence of the returned negative acknowledge signals.

4. A multiplex transmission system according to claim 1, wherein the multiplex nodes each return a negative acknowledge signal when data is not properly received, the predetermined multiplex node determining whether or not data transmission was properly carried out, in accordance with a presence/absence of the returned negative acknowledge signals.

5. A multiplex transmission system according to claim 1, wherein:
   said frame of data includes said identifier preceding the data area, and identifying data to be transmitted in response to the send request; and
   each of multiplex nodes which have data specified by the identifier, samples data from loads or sensors which is to be transmitted to the data area when the identifier is received.

6. A multiplex transmission system according to claim 1, wherein:
   said frame of data including the send request is transmitted through the multiplex transmission lines at predetermined intervals of time; and
   each of multiplex nodes which are to transmit data in response to a send request, samples data from loads or sensors to be transmitted to the data area of a subsequent frame of data including the send request when a preceding frame of data including the send request is received.

7. A multiplex transmission system according to claim 1, wherein:
   one of the multiplex nodes sends a sampling start frame before a frame of data including the send request is transmitted; and
   each of multiplex nodes which are to transmit data in response to a send request, samples data from loads or sensors which is to be transmitted to the data area of a subsequent frame of data including the send request, in accordance with the received sampling frame.

8. A multiplex transmission system comprising:
   multiplex transmission lines; and
   a plurality of multiplex nodes which are interconnected with said multiplex transmission lines, and which transmit a frame of data to each other;
   at least a predetermined one of said multiplex nodes transmitting said frame of data which includes an identifier indicative of a send request of data, first subdivided data areas in which transmission data transmitted from the predetermined multiplex node is inserted, and second subdivided data areas which are assigned to predetermined data of each multiplex node specified by said identifier;
   and wherein when transmitting a frame of data, the predetermined multiplex node generates an error check code for said frame of data in said first subdivided data areas in accordance with said transmission data transmitted therefrom, and generates an error check code for said frame in said second subdivided data areas in accordance with reception data from said each multiplex node specified by said identifier;
   each of said multiplex nodes transmitting said predetermined data to the data area assigned to the respective multiplex nodes in said frame of data only when said frame of data includes an identifier indicative of a send request to the respective multiplex nodes, generating an error check code for a frame of data in accordance with the transmission data from the respective multiplex nodes in a data insertion area for inserting data transmitted from the respective multiplex nodes, of the second subdivided data areas and generating an error check code for a frame of data in accordance with the reception data from each of said multiplex nodes in said first subdivided data areas and the second subdivided data areas other than said data insertion area of the respective multiplex nodes; and each of said multiplex nodes further comparing the error check code generated by the multiplex nodes with that received from said predetermined node, and making a decision whether or not the data is properly transmitted based on a result of the comparison.

9. A multiplex transmission system according to claim 8, wherein said frame of data includes an acknowledge signal area, the multiplex nodes each returning a positive acknowledge signal to the acknowledge signal area in a predetermined order when data is properly received, and the predetermined multiplex node determining whether or not data transmission was properly carried out, in accordance with the returned positive acknowledge signals from each multiplex node.

10. A multiplex transmission system according to claim 8, wherein the multiplex nodes each return a negative acknowledge signal when data is not properly received, the predetermined multiplex node determining whether or not data transmission was properly carried out, in accordance with a presence/absence of the returned negative acknowledge signals.

11. A multiplex transmission system according to claim 8, wherein:

a transmission code of a frame of data transmitted through the multiplex transmission lines has one logical bit which is divided into at least three divided phases;

in said one logical bit, first and third phases of said at least three divided phases being set to a signal level inverted relative to each other, a second phase of said at least three divided phases being set to the same signal level as the signal level of said first phase to thereby indicate a logical "1", said second phase being set to the same signal level as the signal level of said third phase to thereby indicate a logical "0"; and each multiplex node transmitting the data by synchronizing with the signal level of said first phase.

12. A multiplex transmission system according to claim 8, wherein:

said frame of data includes said identifier preceding the data area, and identifying data to be transmitted in response to the send request; and each of multiplex nodes which have data specified by the identifier, samples data from loads or sensors to be transmitted to the data area when the identifier is received.

13. A multiplex transmission system according to claim 8 wherein:

said frame of data, including the send request, is transmitted through the multiplex transmission line at predetermined intervals of time; and each of multiplex nodes which are to transmit data in response to the send request, samples data from loads or sensors to be transmitted to the data area of a subsequent frame of data including the send request when a preceding frame of data including the send request is received.

14. A multiplex transmission system according to claim 8, wherein:

one of the multiplex nodes sends a sampling start frame before the frame of data including the send request is transmitted; and each of multiplex nodes which are to transmit data in response to the send request, samples data from loads or sensors to be transmitted to the data area of a subsequent frame of data including the send request, in accordance with the received sapling frame.

15. A multiplex transmission system comprising:

multiplex transmission lines; and a plurality of multiplex nodes which are interconnected with said multiplex transmission lines, and which relatively transmit a frame of data including a transmission code having one logical bit divided into at least first, second and third divided phases, in which when said first and third phases of said divided phases are set to a signal level inverted relative to each other, a logic "1" is indicated by setting said second phase of said divided phases to a same signal level as said first phase, and a logic "0" is indicated by setting said second phase to a same signal level as said third phase;

at least a predetermined one of said multiplex nodes transmitting said frame of data which includes an identifier indicative of a send request of data, and a data area following said identifier, and said data area being divided into subdivided areas, each of said subdivided areas being assigned to the data of the multiplex node specified by said identifier; and each of said multiplex nodes transmitting the data to the data area assigned to the respective multiplex nodes in said frame by synchronizing with the signal level of said first phase, only when said frame of data includes an identifier indicative of a send request to the respective multiplex nodes.

16. A multiplex transmission system, comprising:

multiplex transmission lines; and a plurality of multiplex nodes which are interconnected with said multiplex transmission lines, and which transmit a frame of data having a transmission code composed of a NRZ (Non Return to Zero) code and being previously determined by using a stuffing bit rule having the number of predetermined bits, to each other;

at least a predetermined one of said multiplex nodes transmitting said frame of data which includes an identifier indicative of a send request of data and a data area following said identifier, and said data area being divided into subdivided areas, each of said subdivided areas being assigned to the data of the multiplex node specified by said identifier;

each of said subdivided areas being set to a number of bits smaller than said predetermined number of bits by means of a signal which does not break said stuffing bit rule; and each of said multiplex nodes transmitting the data to the data area assigned to the respective multiplex nodes in said frame of data by synchronizing with said signal, only when said frame of data includes an identifier indicative of a send request to the respective multiplex nodes.

17. A multiplex transmission system comprising:

multiplex transmission lines; and a plurality of multiplex nodes which are interconnected to said multiplex transmission lines, and which relatively transmit a frame of data including a transmission code having one logical bit divided into at least divided phases, in which when said first and third phases of said divided phases are set to a signal level inverted relative to each other, a logic "1" is indicated by setting said second phase of said divided phases to a same signal level as said first phase, and a logic "0" is indicated by setting said second phase to a same signal level as said third phase;

at least a predetermined one of said multiplex nodes transmitting said frame of data which includes an identifier indicative of a send request of data and a data area following said identifier, and said data area being divided into subdivided areas, each of said subdivided areas being assigned to the data of the multiplex node specified by said identifier, and making a decision whether or not data transmission is properly carried out in accordance with the presence of a positive reception acknowledge signal returned to a reception acknowledge signal area of said frame of data from each of the specified multiplex nodes; and each of said multiplex nodes transmitting the data to the data area assigned to the respective multiplex nodes in said frame of data by synchronizing with the signal level of said first phase, only when said frame of data includes an identifier indicative of a send request to the respective multiplex nodes, and returning said positive reception acknowledge signal to the reception acknowledge signal area of said frame of data in a predetermined order when data transmission is properly carried out.

18. A multiplex system comprising:

multiplex transmission lines; and a plurality of multiplex nodes which are interconnected with said multiplex transmission lines, and which relatively transmit a frame of data including a transmission code having one logical bit divided into at least first, second and third divided phases, in which when said first and third phases of said divided phases are set to a signal level inverted relative to each other, a logic "1" is indicated by setting said second phase of said divided phases to a same signal level as said first phase, and a logic "0" is indicated by setting said second phase to a same signal level as said third phase;

at least a predetermined one of said multiplex nodes transmitting said frame of data which includes an identifier indicative of a send request of data and a data area following said identifier, and said data area being divided into subdivided areas, each of said subdivided area being assigned to the data of the multiplex node specified by said identifier, and making a decision whether or not data transmission is properly carried out in accordance with the presence of a negative reception acknowledge signal returned to a reception acknowledge signal area of said frame of data from each of the specified multiplex nodes; and each of said multiplex nodes transmitting the data to the data area assigned to the respective multiplex nodes in said frame of data by synchronizing with the signal level of said first phase, only when said frame of data includes an identifier indicative of a send request to the respective multiplex nodes, and returning said negative reception acknowledge signal to the reception acknowledge signal area of said frame of data in a predetermined order when data transmission is properly carried out.

* * * * *